T. BRABSON.
SHEARING-MACHINE.

No. 178,402. Patented June 6, 1876.

Witnesses.
Otto Hufeland.
Robt. E. Miller.

Inventor.
Thomas Brabson
per
Van Santvoord & Hauff
Attorneys

UNITED STATES PATENT OFFICE.

THOMAS BRABSON, OF GREEN POINT, NEW YORK.

IMPROVEMENT IN SHEARING-MACHINES.

Specification forming part of Letters Patent No. 178,402, dated June 6, 1876; application filed April 6, 1876.

*To all whom it may concern:*

Be it known that I, THOMAS BRABSON, of Green Point, in the county of Queens and State of New York, have invented a new and useful Improvement in Machines for Clipping Hair or Wool from Animals, which improvement is fully set forth in the following specification, reference being had to the accompanying drawing, in which—

Figure 1:
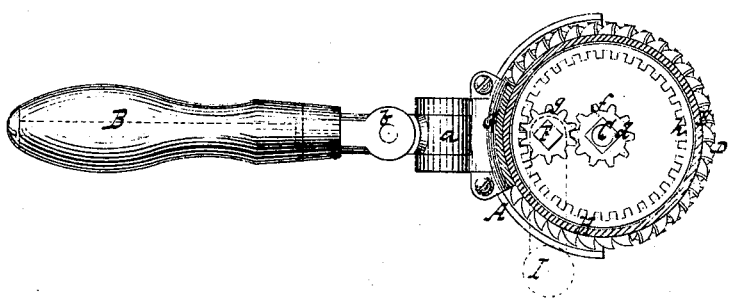
Figure 2:
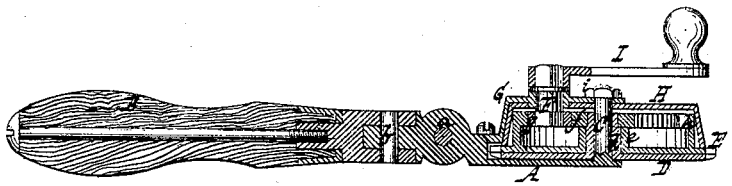

Figure 1 represents a sectional plan. Fig. 2 is a longitudinal vertical section.

Similar letters indicate corresponding parts.

This invention consists in the combination of two cutters, which are mounted on the same spindle, and connected to a driving-shaft, both the spindle and the shaft being secured to a common supporting-plate, connected to a suitable handle, so that by turning said shaft the cutters are caused to revolve in opposite directions, and by these means the operation of clipping hair or wool from animals is materially facilitated. The handle is connected to the supporting-plate by a universal joint, so that the cutting mechanism can readily accommodate itself to the sinuosities of the body of the animal subjected to the clipping operation. A protecting-case prevents the hair or wool from catching in and clogging up the gear-wheels which transmit motion to the cutters.

In the drawing, the letter A designates a supporting-plate, which is connected by a universal joint, *a b*, to a handle, B. In the supporting-plate is firmly secured a spindle, C, on which turns the cutters D E, one of said cutters, D, being provided with a hub, *d*, which extends through the hub *e* of the other cutter, E, and on the upper end of which is mounted a pinion, *f*, which gears in a pinion, *g*, mounted on the driving-shaft F.

The cutter E is provided with a rim, *h*, which has cogs on its inner circumference, and these cogs are in gear with the pinion *g* on the driving-shaft F. By turning this driving-shaft the cutters D E are caused to revolve in opposite directions; and since said cutters are provided with teeth which have cutting-edges facing in opposite directions, the hairs or fibers which are caught between these cutting-edges are readily clipped.

The shaft F is mounted in a bracket, G, which is firmly secured to the supporting-plate A, and which catches over the end of the spindle C, being retained by a nut, *i*, which screws on said spindle. Beneath the bracket G is placed a cap, H, which covers the gear-wheels, and prevents the hairs or fibers from interfering with the correct operation of the mechanism.

In the example shown in the drawing, the shaft F is turned by a winch, I; but, if desired, said shaft may be connected to a spring by suitable intermediate gearing, so that when the spring is wound up, and permitted to run down, the cutters D E are caused to revolve until the power of the spring is exhausted.

When the supporting-plate is placed on the body of an animal, the handle, being connected to said plate by a double or universal joint, allows the cutting mechanism to follow the formation of the body of the animal, and the operation of clipping hair or wool from animals can be performed with great rapidity.

What I claim as new, and desire to secure by Letters Patent, is—

1. In a machine for clipping hair or wool from animals, the combination of two cutters with suitable gears and with a driving-shaft, whereby said cutters are caused to revolve in opposite directions, substantially as shown and described.

2. The combination of a suitable cutting mechanism, D E, with a supporting-plate, A, and a handle, B, connected to said supporting-plate by a double or universal joint, substantially as set forth.

3. The combination of two cutters, D E, gears *f g h*, driving-shaft C, supporting-plate A, cap H, and handle B, all constructed and operating substantially as shown and described.

In testimony that I claim the foregoing I have hereunto set my hand and seal this 3d day of April, 1876.

THOMAS BRABSON. [L. S.]

Witnesses:
W. HAUFF,
E. F. KASTENHUBER.